(12) United States Patent
Seeley

(10) Patent No.: US 9,800,055 B2
(45) Date of Patent: Oct. 24, 2017

(54) SYNCHRONIZATION OF GENERATORS USING A COMMON TIME REFERENCE

(71) Applicant: Schweitzer Engineering Laboratories, Inc., Pullman, WA (US)

(72) Inventor: Nicholas C. Seeley, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 161 days.

(21) Appl. No.: 15/003,356

(22) Filed: Jan. 21, 2016

(65) Prior Publication Data

US 2017/0214249 A1 Jul. 27, 2017

(51) Int. Cl.
*H02J 1/00* (2006.01)
*H02J 3/00* (2006.01)
*H02J 3/44* (2006.01)

(52) U.S. Cl.
CPC ..................................... *H02J 3/44* (2013.01)

(58) Field of Classification Search
USPC ...................................................... 307/84, 87
See application file for complete search history.

(56) References Cited

U.S. PATENT DOCUMENTS

| | | | |
|---|---|---|---|
| 3,794,846 A * | 2/1974 | Schlicher | H02J 3/42 307/87 |
| 3,921,047 A | 11/1975 | Carter | |
| 4,142,591 A | 3/1979 | Himmelstein | |
| 4,228,396 A | 10/1980 | Palombo | |
| 4,229,694 A | 10/1980 | Wilson | |
| 4,450,403 A | 5/1984 | Dreiseitl | |
| 4,463,306 A | 7/1984 | de Mello | |
| 4,506,339 A | 3/1985 | Kuhnlein | |
| 4,766,370 A | 8/1988 | Carr | |
| 4,991,429 A | 2/1991 | Stacey | |
| 5,537,322 A | 7/1996 | Denz | |
| 5,541,488 A | 7/1996 | Bansal | |
| 5,793,750 A | 8/1998 | Schweitzer | |

(Continued)

FOREIGN PATENT DOCUMENTS

WO 2013184143 12/2013

OTHER PUBLICATIONS

PCT/US2015/030481 Patent Cooperation Treaty, International Search Report and Written Opinion of the International Searching Authority, dated Aug. 7, 2015.

(Continued)

*Primary Examiner* — Adam Houston
(74) *Attorney, Agent, or Firm* — Jared L. Cherry

(57) ABSTRACT

The present disclosure pertains to systems and methods for using time synchronized measurements of a generator output and an electrical bus, together with generator control algorithms to synchronize the frequency, voltage, and phase of a generator, or group of generators, prior to electrically connecting the generator to the electrical bus. More particularly, but not exclusively, the present disclosure pertains to systems that may be operated in an islanded configuration and in which one or more generators may be selectively synchronized based on a common time reference. The common time reference may allow the generators to be synchronized by autonomously driving one or more generators to a specified phase angle and frequency.

25 Claims, 6 Drawing Sheets

(56) References Cited

U.S. PATENT DOCUMENTS

| | | | |
|---|---|---|---|
| 6,191,500 B1* | 2/2001 | Toy | H02J 3/46 307/64 |
| 6,245,066 B1 | 6/2001 | Morgan | |
| 6,476,521 B1 | 11/2002 | Lof | |
| 6,642,700 B2 | 11/2003 | Slade | |
| 6,662,124 B2 | 12/2003 | Schweitzer | |
| 6,845,333 B2 | 1/2005 | Anderson | |
| 6,915,186 B2 | 7/2005 | Patterson, Jr. | |
| 6,934,654 B2 | 8/2005 | Benmouyal | |
| 6,947,264 B2 | 9/2005 | Gill | |
| 6,947,269 B2 | 9/2005 | Lee | |
| 7,285,949 B2 | 10/2007 | Bruns | |
| 8,248,060 B2 | 8/2012 | Schweitzer | |
| 8,248,061 B2 | 8/2012 | Schweitzer | |
| 8,674,683 B2 | 3/2014 | Schweitzer | |
| 8,912,792 B2 | 12/2014 | Seeley | |
| 2002/0033052 A1 | 3/2002 | Kondo | |
| 2004/0126224 A1 | 7/2004 | Staroselsky | |
| 2005/0177411 A1* | 8/2005 | Schuhn | G06Q 30/02 705/7.31 |
| 2005/0206530 A1* | 9/2005 | Cumming | G01D 4/006 340/870.02 |
| 2006/0100819 A1 | 5/2006 | Grant | |
| 2007/0090719 A1* | 4/2007 | Shervington | H02K 1/185 310/254.1 |
| 2008/0080104 A1* | 4/2008 | Yagudayev | H02J 3/40 361/20 |
| 2009/0089608 A1 | 4/2009 | Guzman-Casillas | |
| 2009/0091303 A1 | 4/2009 | Schweitzer, III | |
| 2010/0148588 A1* | 6/2010 | Algrain | H02P 5/50 307/84 |
| 2010/0320763 A1 | 12/2010 | Li | |
| 2011/0231171 A1 | 9/2011 | Jousselin | |
| 2011/0240628 A1 | 10/2011 | Goretti | |
| 2011/0260042 A1 | 10/2011 | Schweitzer, III | |
| 2012/0049638 A1* | 3/2012 | Dorn | H02J 3/42 307/87 |
| 2012/0063039 A1* | 3/2012 | Shah | H02H 7/261 361/20 |
| 2012/0313490 A1 | 12/2012 | Schweitzer, III | |
| 2013/0088799 A1 | 4/2013 | Zeller | |
| 2014/0055126 A1 | 2/2014 | Seeley | |
| 2014/0100702 A1 | 4/2014 | Schweitzer, III et al. | |
| 2014/0111377 A1 | 4/2014 | Achanta | |
| 2014/0117912 A1 | 5/2014 | Gajic | |
| 2015/0331052 A1 | 11/2015 | Seeley | |
| 2016/0065006 A1* | 3/2016 | Woods | B64G 1/64 307/84 |
| 2016/0134121 A1* | 5/2016 | Bartsch | F03D 7/0284 307/52 |
| 2016/0245850 A1* | 8/2016 | Kasztenny | G01R 23/02 |
| 2017/0146577 A1* | 5/2017 | Kasztenny | H01H 47/00 |
| 2017/0147026 A1* | 5/2017 | Forbes, Jr. | G05F 1/66 |
| 2017/0214249 A1* | 7/2017 | Seeley | H02J 3/44 |

OTHER PUBLICATIONS

Demetrios A. Tziouvaras, Daqing Hou, Schweitzer Engineering Laboratories, Inc., Out-Of-Step Protection Fundamentals and Advancements, Jan. 1, 2003.

GMM, Optical Pick-Up (OPU) Specifications & Hook-Up, Oct. 3, 1995.

Encoder Design Guide, Optical Encoder Design and Operation, Nov. 11, 2004.

Optical Encoder Design and Operation, Apr. 1, 2005.

Patent Cooperation Treaty, International Search Report PCT/2008/079228, dated Dec. 8, 2008.

Patent Coperation Treaty, Written Opinion of the International Searching Authority PCT/2008/079228, dated Dec. 8, 2008.

Stephen Petronio, Optical Rotary Encoder Basics, Design News for Mechanical and Design Engineers, Apr. 22, 2002.

Zhou Jie, Zhang Daonong, Yu Yuehai, Wu Jingtao, Zhou Ji, Bi Tianshu, Xiong Ming, Rotor Position Measurement Method for Generator Power Angles, 2011 The International Conference on Advanced Power System Nutomation and Protection, Oct. 16, 2011.

PCT/US2013/056271, Patent Cooperation Treaty, International Search Report and Written Opinion of the International Searching Authority, dated Feb. 10, 2014.

* cited by examiner

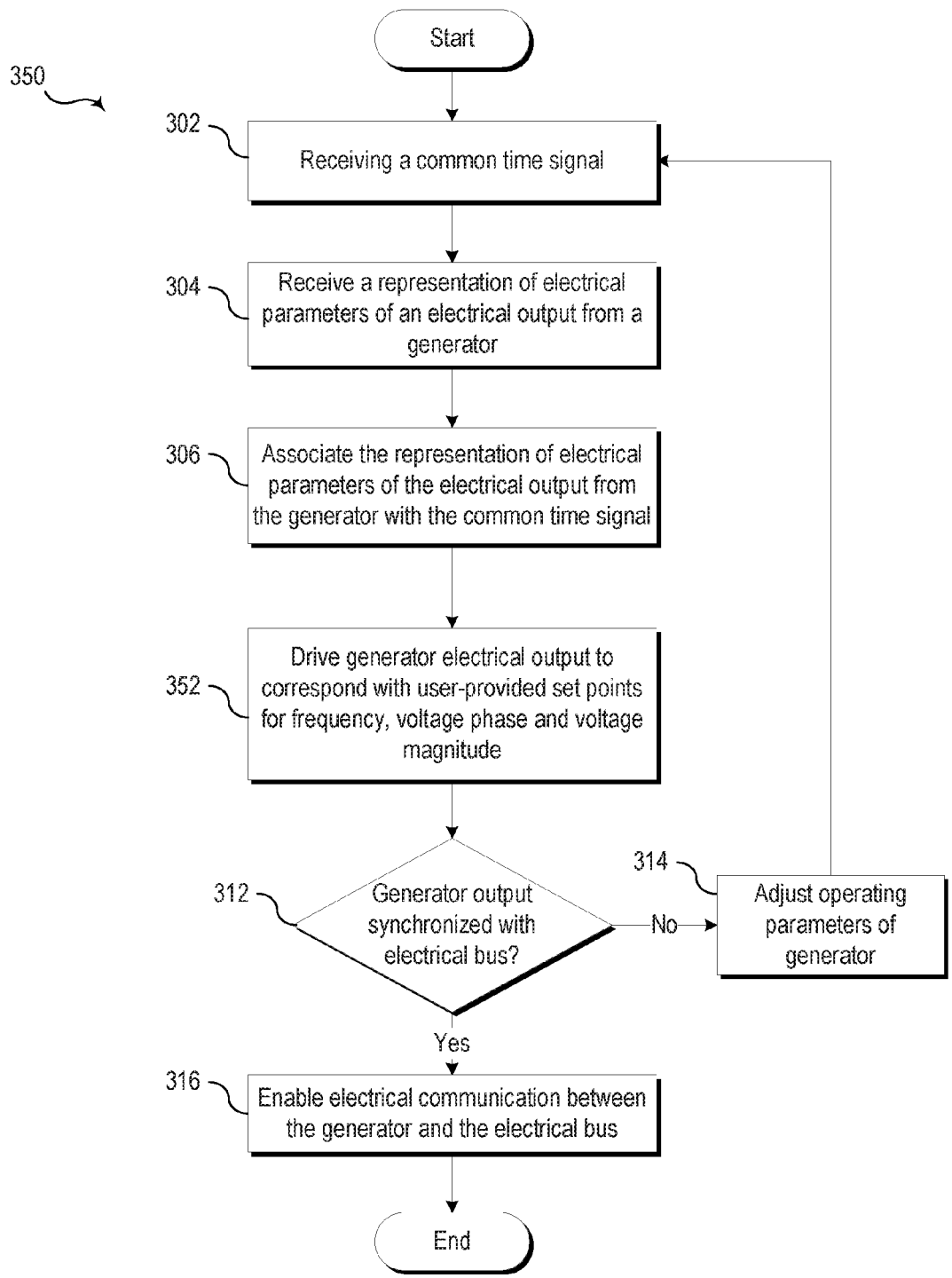

_US 9,800,055 B2_

SYNCHRONIZATION OF GENERATORS USING A COMMON TIME REFERENCE

TECHNICAL FIELD

The present disclosure pertains to systems and methods for synchronization of generators using time synchronized measurements.

BRIEF DESCRIPTION OF THE DRAWINGS

Non-limiting and non-exhaustive embodiments of the disclosure are described, including various embodiments of the disclosure, with reference to the figures, in which:

FIG. 3B illustrates a flow chart of a method of synchronizing one or more electrical generators to one or more electrical buses based on user-provided parameters consistent with embodiments of the present disclosure.

DETAILED DESCRIPTION

Figure 1:
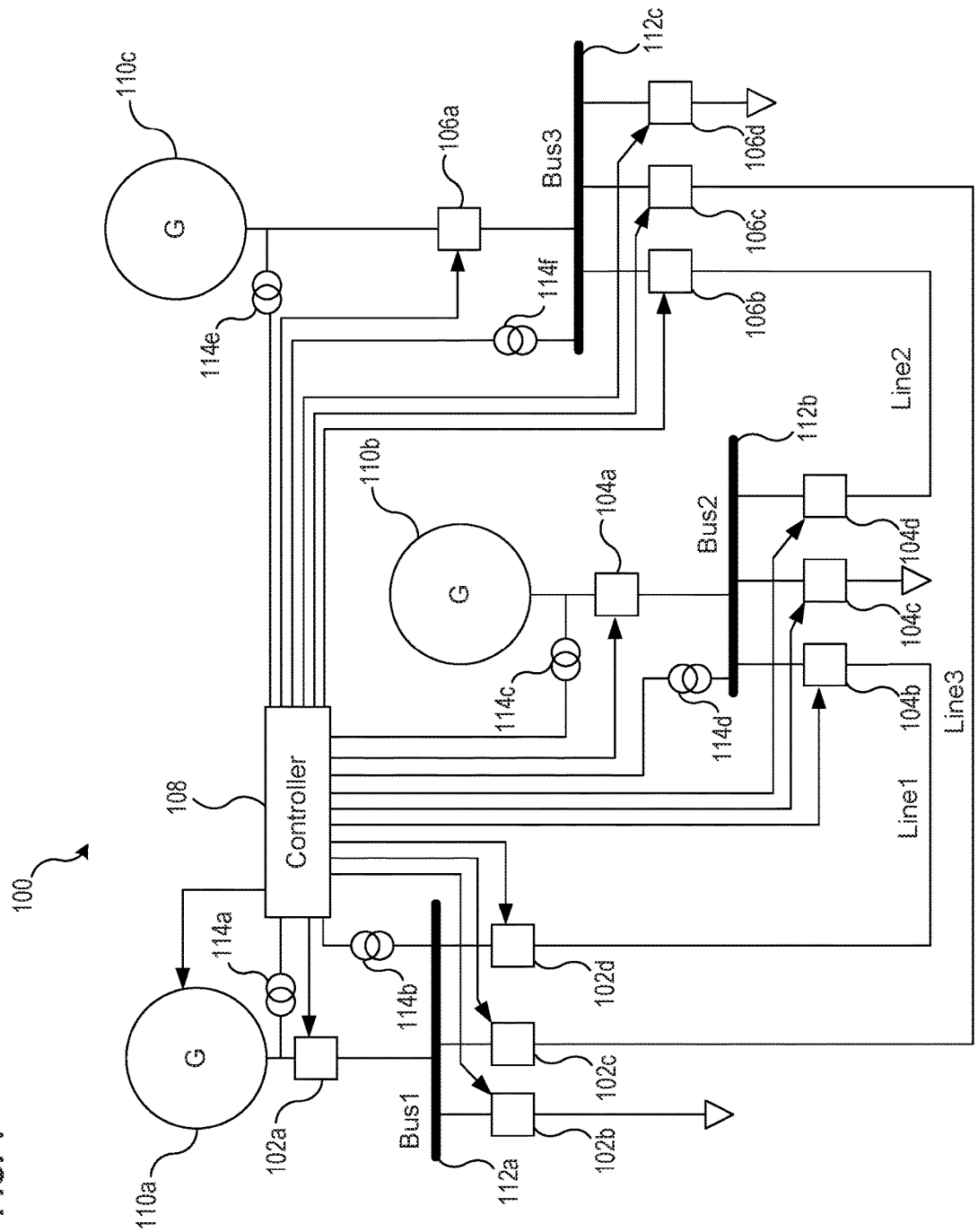
FIG. 1 illustrates a simplified electrical diagram of an electric power generation system comprising a plurality of electrical generators, each of which may be synchronized to a plurality of electrical buses, and in which representations of electrical conditions associated with each of the plurality of generators and the plurality of electrical buses are provided to a single controller consistent with embodiments of the present disclosure.

Synchronizing a generator, or group of generators, to an electrical bus involves obtaining measurements of electrical frequency, voltage magnitude, and phase angle at both the generator output and the bus to which the generator is to be synchronized. A controller may utilize representations of electrical conditions associated with the output of the generator, such as measurements of the frequency and voltage of the generator and the electrical system, to adjust operating parameters of the generator (e.g., speed, phase, excitation voltage, etc.) to synchronize the generator and the electrical bus. Once the generator and the bus are synchronized, the generator may be electrically connected to the bus and may provide electrical power to the electrical power system served by the bus.

In some embodiments consistent with the present disclosure, inputs from sensors used to monitor electrical conditions associated with a plurality of electrical generators may be provided to a common controller. Further, the common controller may also receive measurements representing electrical conditions associated with the plurality of electrical buses. Using the measurements from the plurality of generators and the plurality of electrical buses, the common controller may adjust the operating parameters of the generators to achieve synchronous operation.

In some implementations, signals from a plurality of generators may be routed to a common controller that may synchronize the generators. Such an implementation may pose practical difficulties due to the number of signals that need to be wired to the common controller. Such topologies are common in relatively smaller islanded power systems, such as those used on offshore platforms, ships, or industrial sites that are, or may be operated islanded from a larger electrical grid. Islanded electrical power generation and delivery systems may also be referred to as micro-grid systems. Micro-grid systems may be designed to operate independent of an electric utility grid. Micro-grid systems may be designed with redundancies, in order to maximize the availability of electrical power. A micro-grid system may, for example, include multiple electrical generators that may be selectively activated and deactivated as necessary. Each time an electrical generator is activated, it may need to be synchronized to being connected to the micro-grid. The micro-grid system may be configured such that if an electrical generator is taken off-line, either for maintenance or because of a problem, the micro-grid system may continue to operate.

In various embodiments consistent with the present disclosure, the complexity of a control system configured to synchronize a plurality of generators may be reduced by utilizing a common time signal available to a plurality of controllers to synchronize a plurality generators without the need for a common controller that receives signals from the plurality of generators and without direct communication links between the controllers. Rather, a plurality of controllers may receive the common time signal and may be configured to autonomously control one or more generators. The plurality of controllers may be configured to drive the generators to a specified phase angle and frequency prior to being electrically connected. For example, an operator may specify an arbitrary phase angle (e.g., 0 degrees) and frequency (e.g., 60 Hz) based on the common time signal for one phase of an electrical power system. A first controller may then autonomously drive a first generator to the specified frequency and phase angle reference while a second controller drives a second generator to the specified frequency and phase angle. By synchronizing the generators to the specified phase angle and frequency, the generators are inherently synchronized to each other independent of any direct communication between the devices.

Certain embodiments disclosed herein may be used in connection with systems capable of functioning as "islanded systems." As the term is utilized herein, an islanded system comprises any system in which electric power generators continue to provide electrical power in the absence of a connection to an electrical utility grid. For example, an islanded system may include a utility connected system that includes a distributed generation generator, a backup generator, or the like. Many types of facilities may utilize backup electrical systems (e.g., hospitals, oil refineries, gas separation plants, data centers, and the like), and may operate as an islanded system when electrical power from an electrical utility grid is unavailable. Other systems may generate their own power under typical conditions (e.g., an offshore drilling ship, exploration ships, cruise ships, military ships, and remote facilities that are not connected to an electrical utility grid). Finally, the systems and methods disclosed herein may be used in the protection of electrical generators connected to electrical delivery systems (e.g., a utility grid).

In various embodiments consistent with the present disclosure, operating signals from each of the plurality of generators may be provided to two or more controllers, each of which may be in communication with a common time reference. The common time reference, together with the operating signals from the plurality of generators may be used to synchronize the generators prior to connecting one or more generators to the electric power system. Such a configuration may provide certain advantages, including: reducing the number of signals that need to be supplied to a common controller, decreasing the practical complexity associated with wiring many signals to a single controller, and avoiding a single point of failure.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified electrical diagram of an electric power generation system 100 comprising a plurality of electrical generators 110a-c, each of which may be synchronized to a plurality of electrical buses 112a-c, and in which representations of electrical conditions associated with each of the plurality of generators and the plurality of electrical buses are provided to a single controller 108 consistent with embodiments of the present disclosure. System 100 includes three electrical buses 112a-c, and any of the generators 110a-c may be synchronized to any of the electrical buses 112a-c. Prior to connecting a generator 110a-c to one of the buses 112a-c, the generator may be synchronized to the frequency, phase, and voltage magnitude of the bus to which the generator is to be connected. Using a plurality of breakers 102a-d, 104a-d, and 106a-d, generators 110a-c may be selectively connected to any of buses 112a-c.

The controller 108 may receive frequency and voltage measurements from outputs of the generators 110a-c and electrical buses 112a-c using a plurality potential transformers 114a-f. Using the frequency and voltage measurements, the controller 108 may adjust the speed and the voltage of one of the generators 110a-c to synchronize the generator to one of the electrical buses 112a-c. In some embodiments, the adjustments to the speed and the voltage may be performed by a control system integrated into generators 110a-c. Once the generator speed and voltage is synchronized to a desired bus, the appropriate breakers may be actuated to place the generator into electrical communication with the electrical bus.

In some embodiments, controller 108 may be embodied as an IED. In general, an IED in an electric power system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment. As used herein, an IED may refer to any microprocessor-based device that monitors, controls, automates, and/or protects monitored equipment within system 100.

The term IED may be used to describe an individual IED or a system comprising multiple IEDs.

System 100 provides significant flexibility because any generator can be synchronized to any bus; however, system 100 may be difficult to implement due to the number of signals that need to be wired to controller 108. The topology illustrated in system 100 is common amongst island power systems that may be operated as an islanded system. Islanded systems may be utilized in a wide variety of applications, ranging from facilities that utilize backup electrical systems (e.g., hospitals, oil refineries, gas separation plants, data centers); or systems that generate power under typical conditions (e.g., an offshore drilling ship, exploration ships, cruise ships, military ships, and remote facilities that are not connected to an electrical utility grid).

Figure 2A:
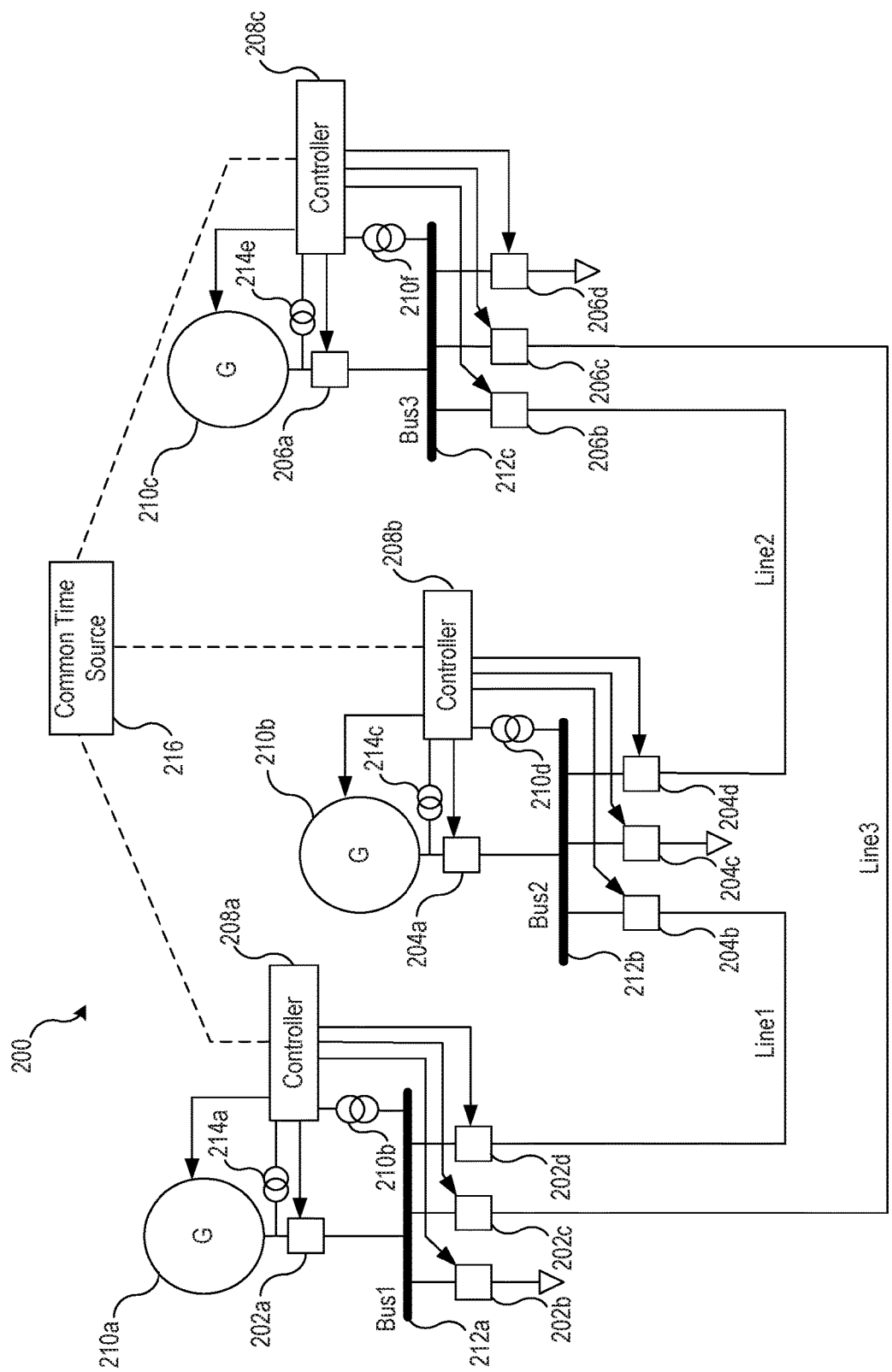
FIG. 2A illustrates a simplified electrical diagram of an electric power generation system comprising a plurality of electrical generators, each of which may be synchronized to a plurality of electrical buses, in which operating signals from the various generators and electrical buses are provided to a plurality of controllers that rely on a common time source to achieve synchronization of the generators with the electrical buses consistent with embodiments of the present disclosure.

FIG. 2A illustrates a simplified electrical diagram of an electric power generation system 200 comprising a plurality of electrical generators 210a-c, each of which may be synchronized to a plurality of electrical buses 212a-c, in which operating signals from the various generators and electrical buses are provided to a plurality of controllers 208a-c that rely on a common time source 216 to achieve synchronization of the generators with the electrical buses consistent with embodiments of the present disclosure. Similar to system 100 illustrated in FIG. 1, the topology of system 200 allows any of the generators 210a-c to be synchronized to any of the electrical buses 212a-c.

Controllers 208a-c may receive frequency and voltage measurements from outputs of the generators 210a-c and electrical buses 212a-c using a plurality potential transformers 214a-f. Using the frequency and voltage measurements, the respective controller 208a-c may adjust the speed, the phase, and the voltage of one of the generators 210a-c to synchronize the generator to one of the electrical buses 212a-c. In some embodiments, the adjustments to the speed and the voltage may be performed by a control system integrated into generators 210a-c. Once the generator speed and voltage is synchronized to a desired bus, the appropriate breakers may be actuated to place the generator into electrical communication with the electrical bus. In the illustrated embodiment, each generator 210a-c is illustrated together with a corresponding controller 208a-c, respectively. Other embodiments may not include a one-to-one correspondence of generators to controllers. For example, one controller may control two generators and a second controller may control one generator. A variety of configurations are contemplated consistent with the present disclosure.

Controllers 208a-c may each receive a common time signal from common time source 216. In various embodiments, the common time source 216 may be embodied using a variety of technologies that are accessible at different locations. Some examples of an external time source 270 include a Global Navigational Satellite System (GNSS) such as the Global Positioning System (GPS) delivering a time signal corresponding with IRIG-B, a WWVB or WWV system, a network-based system such IEEE 1588, and the like.

Given that the common time source is available at multiple locations, in some embodiments synchronization of one of the generators 210a-c may be achieved without bi-directional communication among one or more of the controllers 208a-c. In some embodiments, information regarding phase shift associated with certain components may be determined and accommodated by controllers 208a-c. For example, a power transformer may introduce a known phase shift, and as such, a controller may account for this phase shift in synchronizing the generator. For example electrical bus 212a may have a 30° lead due to a power transformer (not shown). Accordingly, an adjustment of 30° may be applied by a controller prior to connecting a generator to electrical bus 212a.

Figure 2B:
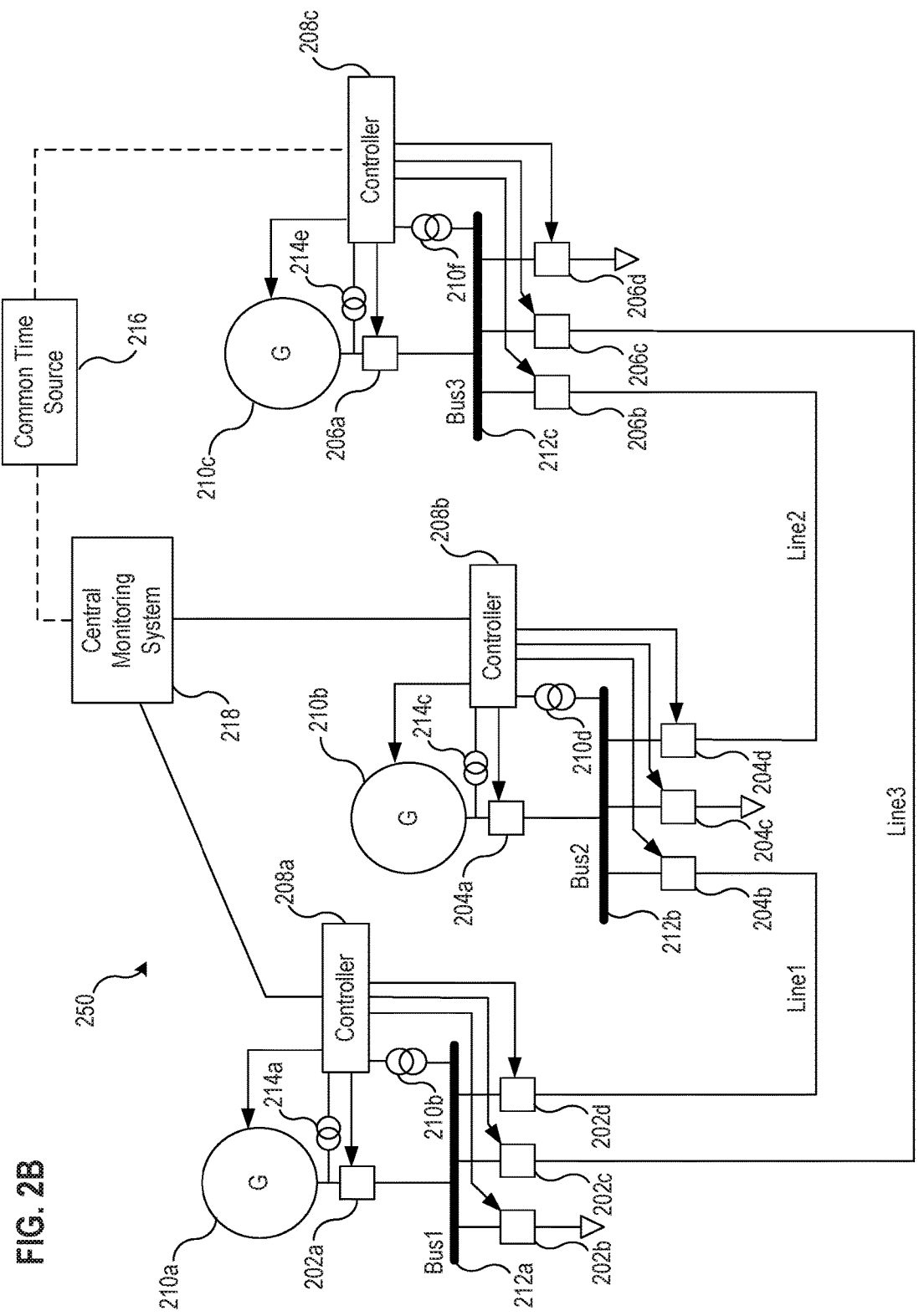
FIG. 2B illustrates a system with a similar topology to the system illustrated in FIG. 2A, in which a central monitoring system is in communication with a plurality of controllers and a common time source, and in which a common time signal and other information is distributed by central monitoring system to the plurality of controllers consistent with embodiments of the present disclosure.

FIG. 2B illustrates a system 250 with a similar topology to the system 200 illustrated in FIG. 2A, in which a central monitoring system 218 is in communication with some controllers 208a-b and all controllers are in communication with a common time source 216 consistent with embodiments of the present disclosure. In the illustrated embodiment, central monitoring system 218 is in communication with controllers 208a-b, but not in direction communication with controller 208c. Nonetheless, controller 208c is in communication with common time source 216 and may rely on common time source 216 to control synchronization of generator 210c.

In various embodiments, the operation of controllers 208a-b may be coordinated by a central monitoring system 218. In various embodiments, central monitoring system 218 may comprise one or more of a variety of types of systems. For example, central monitoring system 218 may include a central IED, a supervisory control and data acquisition (SCADA) system and/or a wide area control and situational awareness (WACSA) system. Communication between central monitoring system 218 and controllers 208a-b may utilize various communication media and communication protocols. In some embodiments, certain controllers may be in direct communication with central monitoring system 218 while other controllers may be in communication with central monitoring system 218 via a communication network. Communications among controllers 208a-c and central monitoring system 218 may be facilitated by networking devices including, but not limited to, multiplexers, routers, hubs, gateways, firewalls, and switches.

Figure 3A:
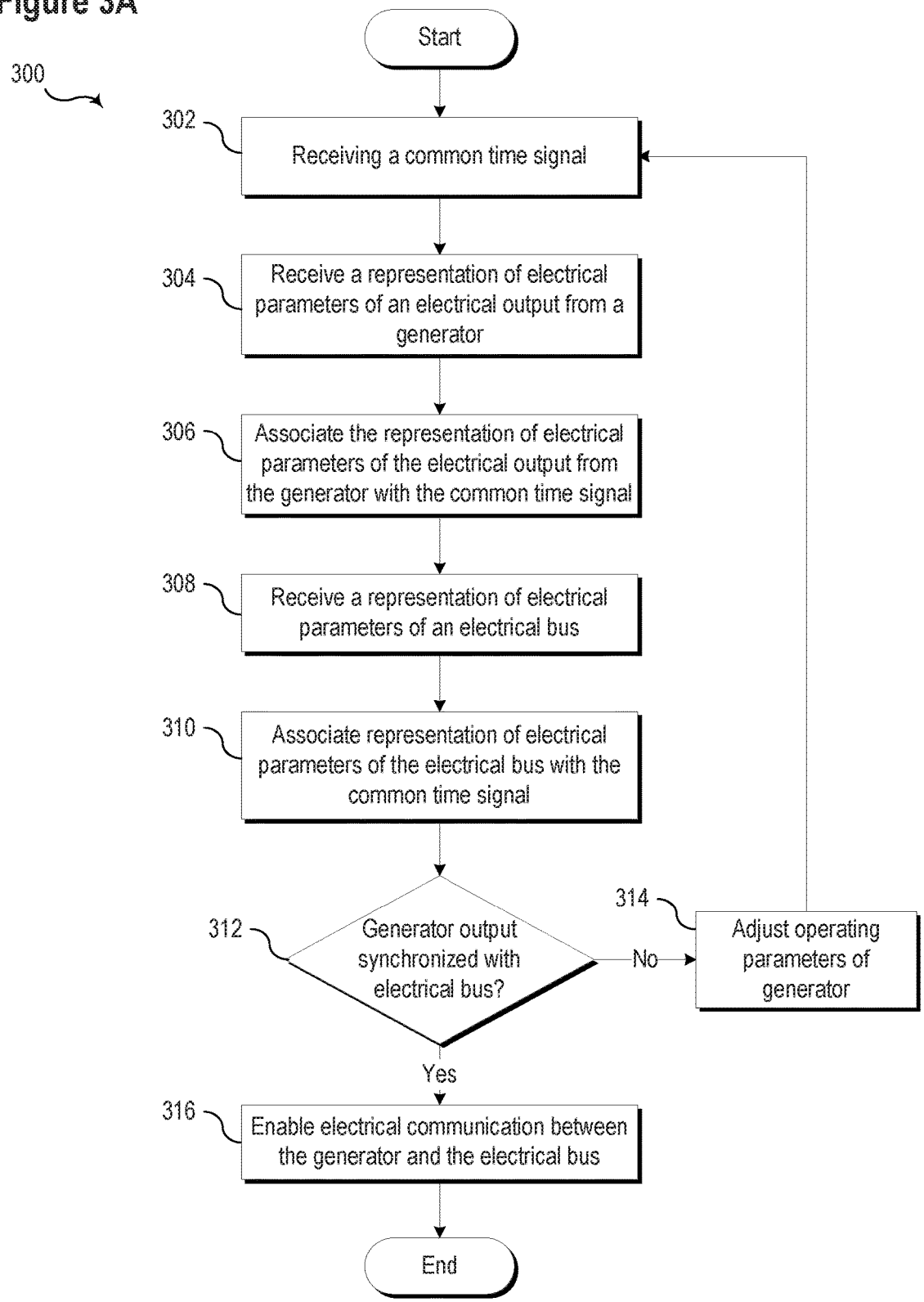
FIG. 3A illustrates a flow chart of a method of synchronizing one or more electrical generators to one or more electrical buses using a plurality of controllers and a common time reference consistent with embodiments of the present disclosure.

FIG. 3A illustrates a flow chart of a method 300 of synchronizing one or more electrical generators to one or more electrical buses using a plurality of controllers and a common time reference consistent with embodiments of the present disclosure. At 302, a common time signal may be received. In various embodiments the common time may be embodied using a variety of technologies and techniques. In one specific embodiment, the common time signal may be received using an IRIG-B time signal. In other embodiments, the common time signal may be received from a GNSS system, a WWVB or WWV system, or a network-based time distribution protocol.

At 304, a representation of electrical parameters of an electrical output of a generator may be received. The representation may comprise a digitized representation of the output of a potential transformer in electrical communication with the output of the electrical generator. In various embodiments, such an output may be analyzed to determine various operating parameters of the generator. Such operating parameters may include the generator speed, output voltage, and phase angle of the output with respect to another signal, such as an electrical bus to which the generator is to be synchronized.

At 306, the representation of electrical parameters of the electrical output of the generator may be associated with the common time signal. In some embodiments, the measurements may be associated with a time stamp based on the common time signal. Some embodiments may associate the measurements and the common time signal in a specific format, such as IEEE C37.118.1, which is also referred to as a synchrophasor.

At 308, a representation of electrical parameters of an electrical bus may be received. The parameters may specifically relate to an electrical bus to which a generator is to be synchronized. The representation may comprise a digitized signal representing the output of a potential transformer in electrical communication with the electrical bus. The representation may be analyzed to determine electrical parameters, including the voltage the electrical bus and the phase angle of the electrical bus with respect to another signal, such as the output of the generator.

At 310, the representation of electrical parameters of the electrical bus may be associated with the common time signal. The association of the electrical parameters of the electrical bus and the output of the generator with the common time signal may allow a controller to utilize the representations to synchronize the output of the generator with an electrical bus.

FIG. 3B illustrates a flow chart of a method 350 of synchronizing one or more electrical generators to one or more electrical buses based on user-provided parameters consistent with embodiments of the present disclosure. At 352, the output of the generator may be driven to user-provided set points for frequency, voltage phase, and voltage magnitude. Use of user-provided set points for operating parameters of the one or more electrical generators may allow for synchronization in the absence of a communication link among controllers associated with the generators. As may be appreciated, element 352 of FIG. 3B, may be substituted for elements 308 and 310 in FIG. 3A, while the remaining elements of method 300 may also be used in method 350.

Returning to a discussion of FIG. 3A, at 312, method 300 may determine whether the output of the generator is synchronized with the electrical bus based on representations of electrical parameters from each of the generator and the electrical bus and the common time signal. If the generator output is not synchronized with the electrical bus, operating parameters of the generator may be adjusted at 314. Such operating parameters may include the speed of the generator rotor, electrical frequency of the generator terminal voltage and the magnitude and phase of the generator terminal voltage of the generator. Adjustment of the operating parameters may cause the generator to speed up, slow down, to match the frequency and/or phase of an electrical bus to which the generator is to be connected. Further, the voltage of a generator may be adjusted by changing the excitation current to increase or decrease the output voltage. Method 300 may iterate through 302 through 314 until the generator output is synchronized to the electrical bus. Once the generator output is synchronized to the electrical bus, as determined at 312, method 300 may pass to 316.

At 316, electrical communication between the generator and the electrical bus may be enabled. In various embodiments, enabling electronical communication may involve closing a breaker or recloser to electrically connect the generator to the electrical bus. A controller implementing method 300 may generate a control instruction issued to actuation components.

Figure 4:
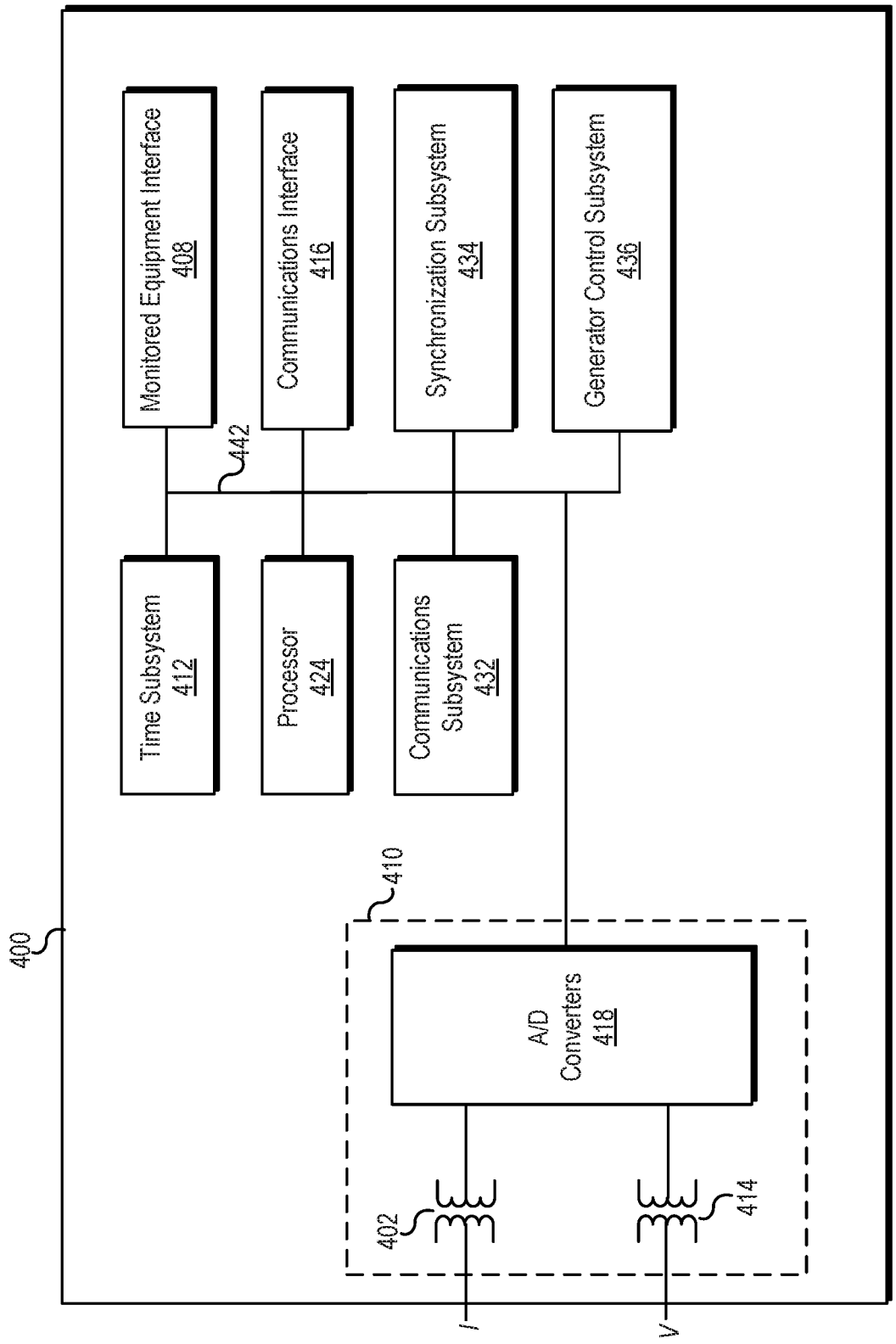
FIG. 4 illustrates a functional block diagram of a controller configured to synchronize one or more generators to one or more electrical buses using a common time reference consistent with embodiments of the present disclosure.

FIG. 4 illustrates a functional block diagram of a controller 400 configured to synchronize one or more generators to one or more electrical buses using a common time reference consistent with embodiments of the present disclosure. In various embodiments, controller 400 may embody any of the controllers illustrated in FIG. 2A and FIG. 2B. Further, in one specific embodiment, controller 400 may be configured to implement method 300 as illustrated in FIG. 3.

Returning to a discussion of FIG. 4, controller 400 may be implemented using hardware, software, firmware, and/or any combination thereof. Moreover, certain components or functions described herein may be associated with other devices or performed by other devices. The specifically illustrated configuration is merely representative of one embodiment consistent with the present disclosure. In certain embodiments, the controller 400 may comprise an IED. The specifically illustrated configuration is merely representative of one embodiment consistent with the present disclosure.

Controller 400 may include a communications interface 416 configured to communicate with other devices and/or systems. In certain embodiments, the communications interface 416 may facilitate direct communication with another device or may communicate with one or more devices using a communications network. Communications subsystem 432 may be configured for communication using a variety of communication media and data communication protocols (e.g., Ethernet, IEC 61850, etc.).

Controller 400 may further include a time subsystem 412, which may be used to receive a time signal (e.g., a common time reference) allowing controller 400 to apply a timestamp to the acquired samples. In various embodiments, time subsystem 412 may comprise a GNSS receiver, IRIG-B receiver, a WWVB or WWV receiver and the like. In certain embodiments, a common time reference may be received via communications interface 416, and accordingly, a separate time input may not be required for time-stamping and/or synchronization operations. One such embodiment may employ the IEEE 1588 protocol.

Time subsystem 412 may further be configured to associate a time stamp based on the common time signal with representations of electrical conditions on the output of one or more electrical generators or one or more electrical buses. Using such time-stamped representations, controller 400 may determine whether a generator is synchronized to an electrical bus to which the generator is to be connected.

A monitored equipment interface 408 may be configured to receive status information from, and issue control instructions to, a piece of monitored equipment (such as a circuit breaker, recloser, etc.). In various embodiments monitored equipment interface 408 may be in communication with one or more breakers or re-closers that may selectively electrically couple an electrical generator to an electrical bus. Still further, in some embodiments, monitored equipment interface 408 may be in communication with an electrical generator, and may be configured to receive information from the generator or to transmit control instructions to the generator. Information received from the generator may relate to the generator speed, voltage, frequency, phase angle, and the like. Information sent to the generator may include control instructions to alter operating parameters of the generator, such as generator speed, output voltage, and phase angle of the output with respect to another signal.

Processor 424 may be configured to process communications received via communications interface 416, time subsystem 412, and/or monitored equipment interface 408. Processor 424 may operate using any number of processing rates and architectures. Processor 424 may be configured to perform various algorithms and calculations described herein. Processor 424 may be embodied as a general purpose integrated circuit, an application specific integrated circuit, a field-programmable gate array, and/or any other suitable programmable logic device.

In certain embodiments, controller 400 may include a sensor component 410. In the illustrated embodiment, sensor component 410 is configured to gather data directly from equipment such as a conductor (not shown) and may use, for example, transformers 402 and 414 and ND converters 418 that may sample and/or digitize filtered waveforms to form corresponding digitized current and voltage signals provided to data bus 442. Current (I) and voltage (V) inputs may be secondary inputs from instrument transformers such as, CTs and VTs, connected to a generator output or an electrical bus. ND converters 418 may include a single ND converter or separate A/D converters for each incoming signal. ND converters 418 may be connected to processor 424 by way of data bus 442, through which digitized representations of current and voltage signals may be transmitted to processor 424.

A synchronization subsystem 434 may be configured to determine whether a generator is synchronized to an electrical bus prior to electrically connecting the generator to the bus. The determination of the synchronization may be based on a common time signal from time subsystem 412. In various embodiments, digitized signals (received from one or more of sensor component 410, monitored equipment interface 408, or communication interface 416) may be used to determine whether a generator is synchronized to an electrical bus.

A generator control subsystem 436 may be configured to adjust operating parameters of a generator to achieve synchronization of the frequency, voltage, and phase of the generator and the electrical bus. The generator control subsystem 436 may, for example increase or decrease the speed of the generator to adjust the phase and the frequency, and/or increase or decrease the excitation voltage of the generator to achieve synchronization.

In some embodiments, the generator control subsystem 436 may be configured to drive an associated generator to a specified phase angle and frequency prior to being electrically connected to an electrical system. The generator control subsystem 436 may allow an operator may specify a phase angle and frequency. In some circumstances, the frequency and phase may be determined by the parameters of an operating electrical system. In other embodiments, a plurality of generators may each be driven a specified frequency and phase. Using the common time signal, the generator control subsystem 436 may adjust the operating parameters of the generator to conform to the specified phase angle and frequency. Once the generator has reached the specified phase angle and frequency, the generator is synchronized and may be electrically connected to the electric power system. In other circumstances, the frequencies and phases of multiple generators may be driven to a common phase and frequency by separate controllers. For example, a first controller may drive a first generator to a specified phase angle and frequency while a second controller drives a second generator to the specified phase angle and frequency. By synchronizing the generators to the specified phase angle and frequency, the generators are inherently synchronized to each other independent of any communication direct communication between the devices or controllers.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system comprising:
   a plurality of electrical generators;
   a plurality of electrical buses to which the plurality of electrical generators are selectively connectable;
   a plurality of controllers operable to select from the plurality of generators a generator to be synchronized and to select from the plurality of electrical buses an electrical bus to be synchronized, each of the plurality of controllers further comprising:
   a generator interface configured to receive a plurality of representations of electrical conditions of an output of the generator to be synchronized;
   an electrical bus interface configured to receive information of electrical conditions on the electrical bus to be synchronized;
   a time subsystem configured to receive a common time signal and configured to:
   associate a time stamp based on the common time signal with the plurality of representations of electrical conditions associated with the output of the generator to be synchronized to create a first time-stamped representation;
   associate a time stamp based on the common time signal with the plurality of representations of electrical conditions associated with the electrical bus to be synchronized to create a second time-stamped representation;
   a synchronization subsystem configured to:
   determine synchronization of the generator to be synchronized and the electrical bus to be synchronized based on the first time-stamped representation and the second time-stamped representation; and
   generate a control instruction to electrically connect the generator to be synchronized to the electrical bus to be synchronized.

2. The system of claim 1, wherein each of the plurality of electrical generators are selectively connectable to each of the plurality of electrical buses.

3. The system of claim 1, wherein at least one of the plurality of controllers is configured to operate in the absence of a bi-direction communication link with at least one other controller.

4. The system of claim 1, wherein the synchronization subsystem is further configured to account for a constant phase shift associated with at least one of the plurality of electrical buses.

5. The system of claim 1, wherein the system is configured to be operated in an islanded configuration.

6. The system of claim 1, wherein the system comprises a microgrid.

7. The system of claim 1, further comprising a IRIG-B receiver and wherein the common time signal comprises an IRIG-B time signal.

8. The system of claim 1, wherein at least one the plurality of controllers further comprises a communications interface configured to communicate with at least one other controller.

9. The system of claim 8, wherein the plurality of representations of electrical conditions on at least one of the plurality of electrical buses is received via the communications interface.

10. The system of claim 8 wherein the plurality of representations of electrical conditions of the output of at least one of the plurality of electrical generators is received via the communications interface.

11. The system of claim 1, wherein at least one of the plurality of controllers further comprises a sensor component configured to gather the plurality of representations of electrical conditions from the output of at least one of the plurality of electrical generators.

12. The system of claim 1, wherein at least one of the plurality of controllers further comprises a sensor component configured to gather the plurality of representations of electrical conditions from at least one of the plurality of electrical buses.

13. The system of claim 1, wherein the common time signal comprises one of a Global Navigational Satellite System (GNSS) signal, a WWVB signal, or and an IEEE 1588 time signal.

14. The system of claim 1, further comprising a generator control subsystem configured to adjust an operating parameter of the generator to be synchronized based on the first time-stamped representation and the second time-stamped representation.

15. A method of operating a first controller, comprising:
receiving a common time signal;
receiving a plurality of representations of electrical parameters of an electrical output of at least one generator;
associating the representation of electrical parameters of the electrical output of the at least one generator with the common time signal to create a first plurality of time-stamped representations;
receiving a plurality of representations of electrical parameters of at least one electrical bus;
associating the plurality of representations of electrical parameters of the at least one electrical bus with the common time signal to create a second plurality of time-stamped representations;
determining that the electrical output of the generator is synchronized to the electrical bus based on the first plurality of time-stamped representations and based on the second plurality of time-stamped representations; and
enabling electrical communication between the generator and the electrical bus.

16. The method of claim 15, further comprising:
operating the at least one generator in an islanded configuration.

17. The method of claim 15, further comprising:
receiving the representations of electrical parameters of the at least one electrical bus from a second controller via a communications interface.

18. The method of claim 15, further comprising:
receiving the representations of electrical parameters of the electrical output of the at least one generator from a second controller via a communications interface.

19. The method of claim 15, further comprising:
receiving the common time signal via a communications interface.

20. The method of claim 15, further comprising:
gathering the plurality of representations of electrical conditions from the output of at least one of the plurality of electrical generators using a sensor component in communication a generator interface of the first controller.

21. The method of claim 15, further comprising:
gathering the plurality of representations of electrical conditions from the at least electrical bus using a sensor component in communication an electrical bus interface of the first controller.

22. A controller, comprising:
a generator interface configured to receive a plurality of representations of electrical conditions of an output of the generator to be synchronized;
an electrical bus interface configured to receive information of electrical conditions on the electrical bus to be synchronized;
a time subsystem configured to receive a common time signal and configured to:
associate a plurality of time stamps based on the common time signal with the plurality of representations of electrical conditions associated with the output of the generator to be synchronized to create a first time-stamped representation;
associate a plurality of time stamps based on the common time signal with the plurality of representations of electrical conditions associated with the electrical bus to be synchronized to create a second time-stamped representation;
a generator control subsystem configured to autonomously drive a first generator connected to a common electrical bus, to a specified phase angle and a specified frequency based on the common time signal;
a synchronization subsystem configured to:
determine when the generator has reached the specified phase angle and the specified frequency based on the first time-stamped representation and the second time-stamped representation; and
generate a control instruction to electrically connect the generator when the generator has reached the specified phase angle and the specified frequency.

23. The controller of claim 22, wherein the controller is further configured to drive a second connected to a common electrical bus to the specified phase angle and the specified frequency based on the common time signal.

24. The controller of claim 23, wherein the controller is further configured to maintain the first generator and the second generator at the specified phase angle and the specified frequency while the synchronization subsystem connects the first generator and the second generator to the common electrical bus.

25. The controller of claim 22, wherein the controller is further configured for use in a system in which a plurality of controllers are each configured to drive a corresponding plurality of generators to the specified phase angle and the specified frequency based on the common time signal.

* * * * *